Feb. 23, 1926.
K. E. PEILER
1,574,736
FEEDER FOR MOLTEN GLASS
Filed August 3, 1912      3 Sheets-Sheet 1
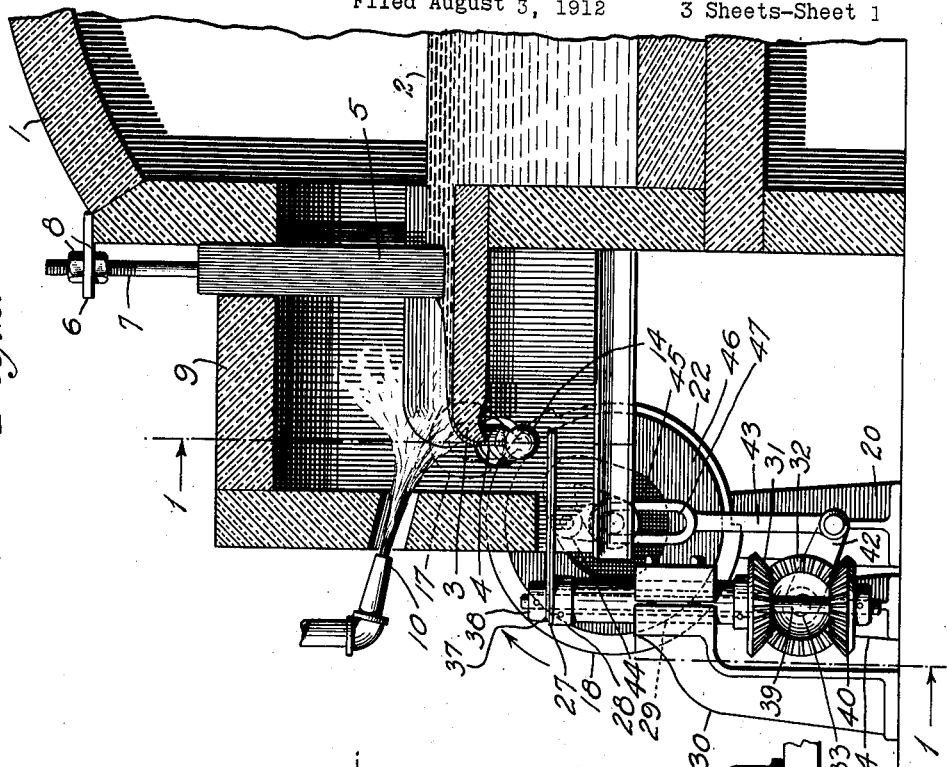
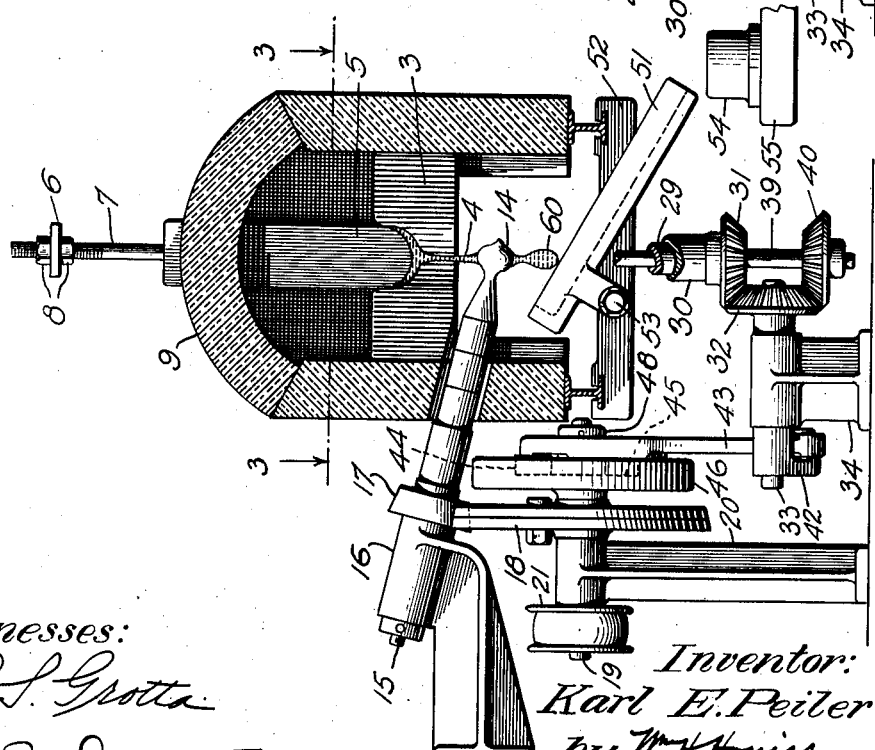
Witnesses:
S. S. Grotta
E. R. Abbott
Inventor:
Karl E. Peiler
by Wm H Honiss
Atty.

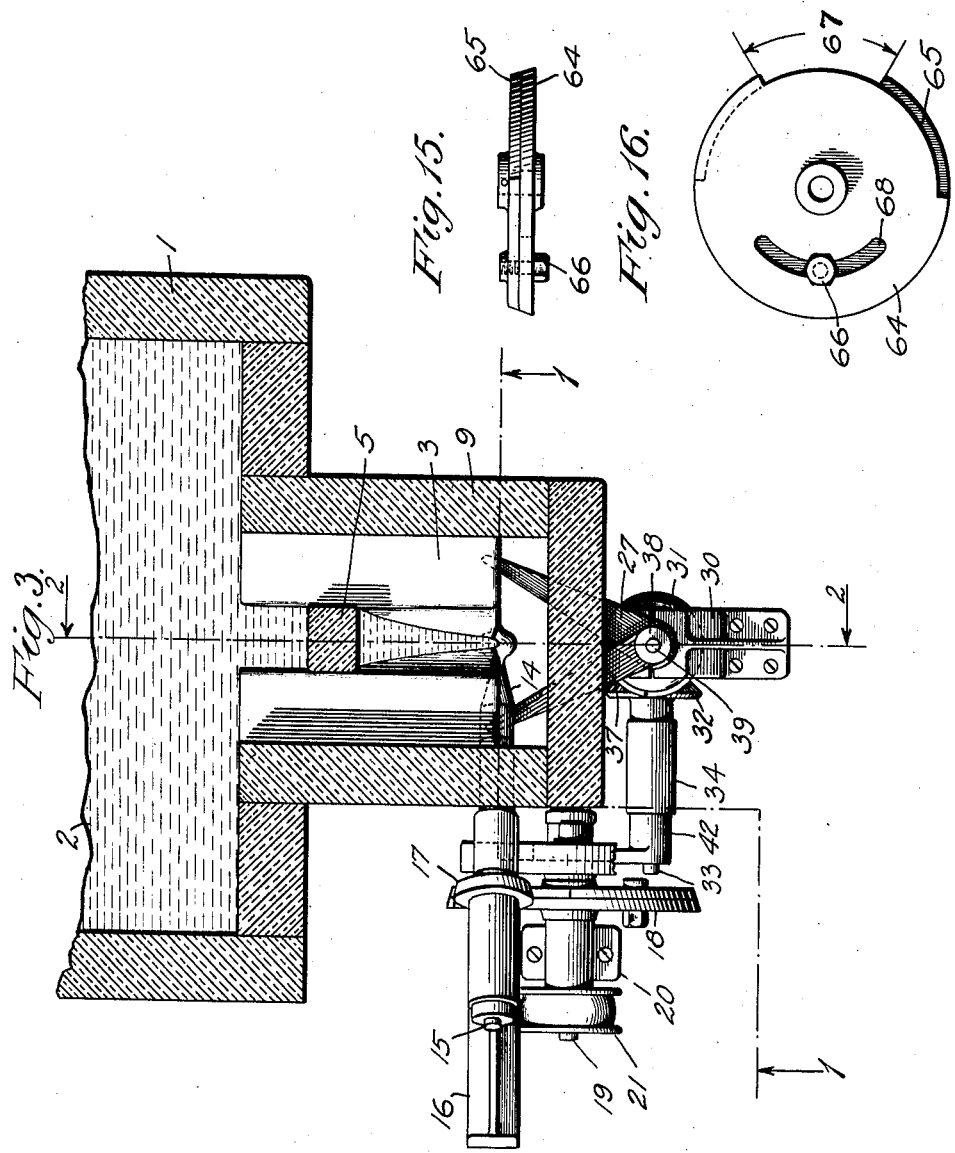

Feb. 23, 1926. 1,574,736
K. E. PEILER
FEEDER FOR MOLTEN GLASS
Filed August 3, 1912   3 Sheets-Sheet 3

Witnesses:
S. S. Grotta
E. R. Abbott

Inventor:
Karl E. Peiler
by W. H. Honiss,
Att'y.

Patented Feb. 23, 1926.

1,574,736

UNITED STATES PATENT OFFICE.

KARL E. PEILER, OF HARTFORD, CONNECTICUT, ASSIGNOR, BY MESNE ASSIGNMENTS, TO HARTFORD-EMPIRE COMPANY, A CORPORATION OF DELAWARE.

FEEDER FOR MOLTEN GLASS.

Application filed August 3, 1912. Serial No. 713,143.

*To all whom it may concern:*

Be it known that I, KARL E. PEILER, a citizen of the United States, residing at Hartford, in the county of Hartford and State of Connecticut, have invented new and useful Improvements in Feeders for Molten Glass, of which the following is a specification.

The invention to be claimed herein comprises an inclined rotating member, preferably contained in a heated chamber, on which glass is fed in a stream from a suitable source of supply, and from which it is delivered for subsequent working.

In this application I show and describe a form thereof which is especially desirable and useful in connection with automatic or semi-automatic machines for pressing and blowing glassware, in which it is important to feed the molten glass to a mold, or to successive molds, in "gathers" of uniform size and at uniform intervals of time and in synchronism with the machines.

The embodiment of this invention illustrated herein is shown to be applied at the outlet of a glass melting tank, delivering its separated charges or masses of glass upon a chute leading to a mold or molds, here assumed to be supported upon the table of a glass pressing machine.

Figure 4:
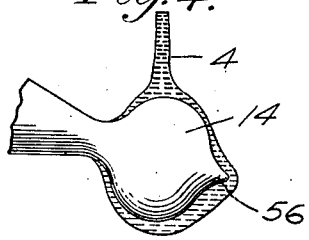
Figure 5:
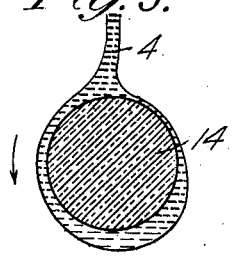
Figure 12:
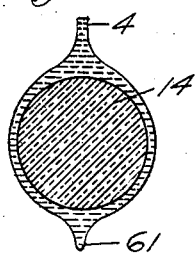
Figure 6:
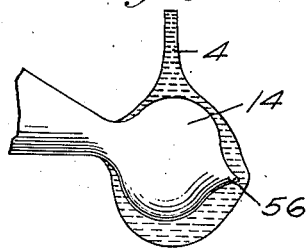
Figure 7:
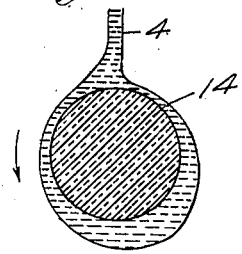
Figure 13:
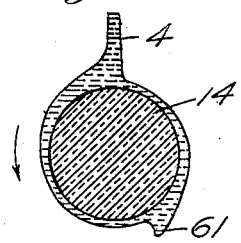
Figure 14:
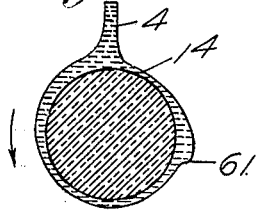

Figure 1 of the drawings is a front view of this embodiment of the invention, in section taken on the line 1—1 of Figs. 2 and 3. Fig. 2 is a side view projected from Fig. 1 and in section taken on the line 2—2 of Fig. 3. Fig. 3 is a plan view in section taken on the line 3—3 of Fig. 1. Figs. 4 to 14 inclusive are detail views in larger scale, showing the gathering head at successive stages in its operation. Figs. 4, 6, 8 and 10 are side views showing the different stages of accumulating the glass upon the gathering head, the glass being shown in section taken approximately through the longitudinal center of the head. Figs. 5, 7, 9 and 11 are end views projected from Figs. 4, 6, 8 and 10, respectively, and are shown in cross-section taken substantially across the largest diameter of the gathering head. Figs. 12, 13 and 14 are additional end views, especially illustrating the winding up and absorption into the next globule of the thread or cord from which the previous globule was severed.

Figs. 15 and 16 are detailed views showing a part of the drive for the punty.

The glass melting tank or furnace 1 containing the supply of molten glass 2 is provided with an outlet spout 3 along which a stream 4 of the molten glass flows. A gate 5 made of refractory material, for regulating the size of the stream, and for stopping it altogether when necessary, is herein shown to be suspended from a bracket 6 by means of a rod 7, threaded nuts 8 or any suitable device being used for adjusting the size of opening beneath the gate. The spout 3 is preferably enclosed by a hood 9, also of refractory material, for confining the heat and maintaining the flowing stream in a suitable heated condition. One or more gas jets 10 are also preferably provided as shown in Fig. 2, for maintaining a suitable and regulated degree of heat within the hood.

The stream of molten glass 4 flows from the end of the spout upon a rotary gathering or accumulating head 14, which is herein shown projecting through an opening in the side of the hood, the parts exposed to the heat being made of suitable refractory material. The head 14 is carried by a suitable stem or shaft 15, which is mounted for rotation in the bracket 16, or any other suitable frame, which may be appurtenant to or integral with the general structure of the furnace. The shaft 15 is provided with a friction roller 17, through which rotary motion is communicated to the head from a friction disc 18, which is mounted upon a shaft 19 journaled in a bracket 20 and is driven by means of a belt applied to the pulley 21 from any convenient source of power.

The rotative speed of the gathering head may be varied by changing the size of the pulley 21, or the relative size of the friction roller 17 and disc 18, or in any other convenient way.

In order to produce the desired intermissions in the rotation of the gathering head, to allow the accumulated gathers to become suspended and severed therefrom, the peripheral driving surface of the friction disc 18 is interrupted as shown at 22 in Fig. 2, the relative length of the driving surface and of its interruption being proportional to the respective periods required for gathering and discharging drops or gathers of the required size. Obviously this will depend upon the size of the stream of glass flowing to the head, and the frequency of the operations. The size of the head should be properly proportioned to these conditions.

For convenience in thus proportioning and altering the alternating periods of rotation and rest of the gathering head, the friction disk is preferably made in two adjustable parts as shown in detail in Figs. 15 and 16, clamped together by a bolt 66 passing through a slot 68 in the disk 64, which permits these disks to be adjusted circumferentially relative to each other, so as to vary the length 67 of the circumferential interruption and thereby correspondingly vary the periods of intermission during which the gathering head rests from its rotation.

For all purposes now contemplated it is considered permissible and preferable thus to entirely interrupt the rotation of the gathering head during the discharging operation, and since this can be accomplished by the simplest forms of driving devices, it is thus illustrated herein. It will be obvious, however, that this is due to the availability of simple mechanism rather than to the requirement of the operation itself, since for the discharge of the glass it is only necessary to retard the rotations of the head sufficiently to enable the glass to slip down over the surfaces of the head faster than those surfaces carry the glass up. Therefore in possible instances wherein it may be found preferable thus to merely slacken the rotations of the head, or even to reverse them, as above suggested, either of these may be accomplished by various well-known and comparatively simple forms of mechanism.

In instances where sufficient time can be allowed, shear mechanism may be dispensed with and the suspended drop be permitted to separate itself from the gathering head by its own weight, which may be aided by starting the head earlier, thereby winding up and attenuating the thread, to make its severance more definite and uniform. But for best results I prefer to employ means, which may be of any well-known form, for severing the drops or globules of glass. The severing means shown herein comprises a pair of shears, the blades 27 and 37 of which are pivotally mounted upon a common center. The lower blade 27 is fixed upon a collar 28, appurtenant to a sleeve 29, which extends downwardly through and has a bearing in the bracket 30, the lower end of the sleeve having upon it a bevel gear 31 meshing with the driving bevel gear 32 upon the shaft 33 journaled in the bracket 34. The upper blade 37 is secured to the collar 38, fixed to the shaft 39, which extends through and is journaled in the sleeve 29 and has fastened upon its lower end the bevel gear 40. Oscillating movement is communicated to the shaft 33 and its driving gear 32 by means of an arm 42, to which is pivoted a connecting rod 43 having upon its upper end a cam roll or pin 44 running in a cam groove 45 in the face of the cam 46, which is secured to and turns with the shaft 19. As a means of guiding the upper end of the connecting rod, it is here shown to be provided with a slot 47 through which the shaft 19 passes, a collar 48 being employed upon the outer side of the rod to retain it in position against the cam.

The drop or gather of glass after being severed from the head may fall directly into the mold or other receptacle for which it is intended, in case the construction and arrangement of the associated machinery enables this to be done; or, as shown in Fig. 1, the severed drop may fall upon transporting means such as a chute 51 supported by a cross bar 52, to which the chute may be pivotally clamped at 53 to permit the chute to be inclined at the proper working angle. The delivery end of the chute may extend to and above a mold 54, or succession of such molds, upon a mold supporting table 55, or to any other arrangement to which the glass is to be delivered.

The rotary gathering head is here shown to be in the general form of a spheroid, the axis of which is preferably inclined, as shown in the drawings, to overcome the tendency the glass would otherwise have of flowing along the stem or shaft 15. The head is supported at one of its poles by its connection with its stem or shaft 15. Its opposite pole is preferably provided with a polar protuberance 56, especially when the gather is likely to be large, relative to the surface of the head. This protuberance insures a more uniform distribution of the accumulating glass over the surface of the head, and appears to hold back the glass from flowing across that polar portion of the head during its rotating and accumulating period.

Figure 8:
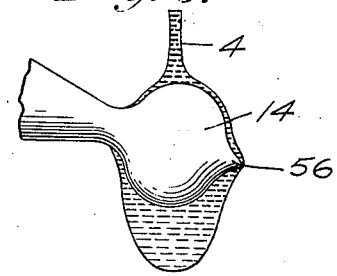
Figure 9:
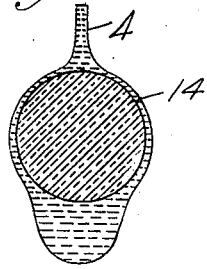
Figure 10:
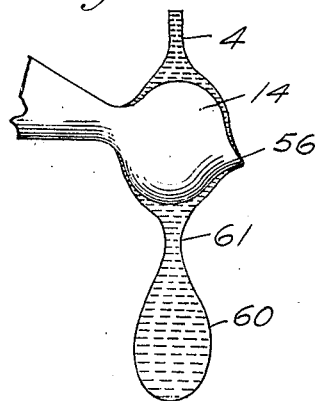
Figure 11:
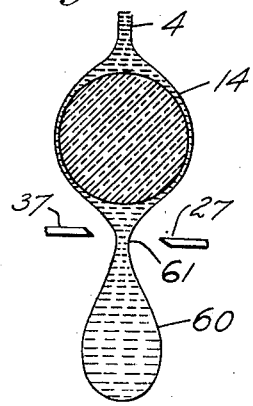

In the operation of this feeder, the stream of molten glass flowing against or upon the revolving surface of the head and flowing thence sidewise toward the polar portions of the head is thus wound around and distributed over the surface and accumulates thereon as indicated by comparison of Figs. 4 to 7 inclusive. When a sufficient amount of molten glass has thus been accumulated by the head, its rotation is slackened or stopped and the glass at once begins to sag downwardly thereon as shown in Figs. 8 and 9, the greater portion of the glass thereon forming a pear shaped drop 60, as shown in Figs. 10 and 11. The main body of the drop is connected to the head by an attenuating cord or thread 61, which if left to itself would be drawn out and severed by the weight of the drop. To avoid the formation of fine and extended threads and also to increase the rapidity and uniformity of operation, severing means are preferably employed, such as the shears illustrated and described herein, which sever the attenuated neck at regular intervals and thus separate the drop from the portion above it, the drop falling into or upon the chute, or being otherwise taken care of, as may be desired. This leaves the head with the glass remaining upon it, and whatever amount of glass has flowed upon it during the severing operation, in aproximately the condition shown in Fig. 12. Practically coincident with the severing operation, the head resumes its former rate and direction of rotation, thus winding up and absorbing the severed end of the thread 61 as shown in Figs. 13 and 14, and thus continuing the accumulation of another drop as illustrated in Figs. 4 to 7 inclusive.

The size of the drops formed may be varied by varying the volume or the rapidity of flow of molten glass to the head, or by varying the length of the interval from one stopping and severing operation to the next. The size of the head, its rotative speed, the time of the pause and the time of rotation may each or all be varied to give the desired results. Instead of stopping the head altogether to allow the glass to sag down and form the drop its rotative speed may be merely diminished so that the glass upon the head flows down faster than it is carried up again by the rotating movement. Or the direction of rotation of the head may be momentarily reversed to allow the drop to form and be severed.

The supply of glass may be made to flow against or upon the head either by gravity or in any other available way.

It is considered preferable to provide a hood and gas jets, or other means, for heating the interior of the hood as herein shown, since this prevents undue chilling of the glass drop or gather, maintaining it in uniform plastic condition. It also serves to prevent undue chilling of the attenuated neck of the drop, and serves to keep hot or to reheat the remaining thread of glass left by the severing operation. The shear device may be of any suitable kind, and its blades may be protected from the heat when in their open or inactive position by means of shields of suitable refractory material. Or the shear blades may be opened wider or withdrawn during their inactive period far enough from the head to avoid being over heated.

The size and form of the gathering head 14, the angle of inclination of its axis, and the rate, direction and variance of its rotation may be modified to suit different requirements. The other features of the invention may also be modified and varied in size, proportion, and disposal relative to each other, to suit different circumstances or conditions of service. In this application no claim is made involving the shears or involving varying the speed of rotation of the gathering head, or involving results produced thereby as the same are claimed in applications filed as divisions or continuations hereof.

I claim as my invention:—

1. In a device for feeding molten glass, a rotary gathering head having an approximately spheroidal form.

2. In a device for feeding molten glass, a rotary gathering head having an approximately spheroidal form, provided with a polar protuberance.

3. A feeder for molten glass, comprising a rotatable gathering head, means for rotating said head, and means for flowing molten glass upon said head, while rotating, whereby a layer of glass is accumulated around the head.

4. In a feeder for molten glass, a rotatable gathering head having an approximately spheroidal form, with its axis inclined from the horizontal, and means for rotating the head upon its axis.

5. In a feeder for molten glass, a gathering head having an approximately spheroidal form, supported at one of its poles for rotation, and provided at its opposite pole with a polar protuberance.

6. In feeders for molten glass, the combination of a rotary gathering head, means for supplying a constant flow of molten glass to and winding it around the head, and means for heating said head and its accumulating glass.

7. In feeders for molten glass, the combination of a rotary gathering head, means for flowing a continuous supply of the molten glass to and winding it around the head, and means for heating said head and the glass flowing thereto.

8. In feeders for molten glass, the combination of a conduit for flowing molten glass, a rotary gathering head disposed in contact with the flow of glass, means for rotating the head to gather an accumulation of the flowing glass, and heat-retaining walls covering the conduit and laterally surrounding the head to confine the heat of the glass thereto.

9. Apparatus for handling molten glass comprising in combination an inclined rotatable implement, means for rotating said implement, and means for flowing molten glass upon said implement as it rotates, whereby a layer of glass is accumulated around the implement.

10. In combination, a container for molten glass, a channel conducting and discharging the glass from said container, said channel having a discharge lip over which the glass flows in a continuous stream, a vertically movable gate for controlling the flow of glass through said channel, and a rotatable implement arranged to receive and wind the said stream of glass.

11. In combination, a container for molten glass, a channel conducting and discharging the glass from said container, said channel having a discharge lip over which the glass flows in a continuous stream, a vertically movable gate for controlling the flow of glass through said channel, and a rotatable implement arranged to receive and wind the said stream of glass, said implement being mounted rotatably in a bearing and being inclined downwardly from said bearing to a free lower end.

12. In combination, a container for molten glass, a channel conducting and discharging the glass from said container, said channel having a discharge lip over which the glass flows in a continuous stream, a vertically movable gate for controlling the flow of glass through said channel, a rotatable implement arranged to receive and wind the said stream of glass, said implement being mounted rotatably in a bearing and being inclined downwardly from said bearing to a free lower end, and an enclosure surrounding said implement and adapted to heat the glass upon said implement.

13. The combination with a container for molten glass having, at its outlet, a member rotating on an inclined axis and receiving on its periphery glass flowing from the outlet, the member having a diameter at its lower end less than at the point where it receives the glass.

In testimony whereof I have signed my name to this specification.

KARL E. PEILER.